(12) United States Patent
Shivalinga et al.

(10) Patent No.: US 12,145,497 B2
(45) Date of Patent: Nov. 19, 2024

(54) CARGO RESTRAINT ACTUATOR ASSEMBLY

(71) Applicant: Goodrich Corporation, Charlotte, NC (US)

(72) Inventors: Vinodkumar Shivalinga, Bangalore (IN); Vikramkumar Bogar Kumbare, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 1007 days.

(21) Appl. No.: 17/125,428

(22) Filed: Dec. 17, 2020

(65) Prior Publication Data

US 2021/0261041 A1 Aug. 26, 2021

(30) Foreign Application Priority Data

Feb. 25, 2020 (IN) .............................. 202041007985

(51) Int. Cl.
*B60P 7/08* (2006.01)
*B60P 7/13* (2006.01)
*B64D 9/00* (2006.01)

(52) U.S. Cl.
CPC .............. *B60P 7/13* (2013.01); *B60P 7/0815* (2013.01); *B64D 9/003* (2013.01)

(58) Field of Classification Search
CPC ........... B60P 7/13; B60P 7/0815; B60P 1/649; B60P 7/0892; B64D 9/003

USPC .......... 410/77, 78, 80, 94, 95; 267/168, 290, 267/291; 60/528, 529
See application file for complete search history.

(56) References Cited

U.S. PATENT DOCUMENTS

| | | | | |
|---|---|---|---|---|
| 2,934,336 | A * | 4/1960 | Kimsey | F16F 1/125 267/290 |
| 7,556,462 | B2 * | 7/2009 | Huber | B64D 9/003 410/80 |
| 7,731,460 | B2 | 6/2010 | Brown et al. | |
| 8,209,976 | B2 | 7/2012 | Vaidyanathan et al. | |
| 10,118,700 | B2 | 11/2018 | Kuppan et al. | |
| 2010/0196116 | A1 * | 8/2010 | Hudson | B64D 9/003 410/77 |
| 2013/0259593 | A1 * | 10/2013 | Moradians | B64D 9/003 410/77 |
| 2019/0210730 | A1 | 7/2019 | Riedel et al. | |

* cited by examiner

*Primary Examiner* — Stephen T Gordon
(74) *Attorney, Agent, or Firm* — SNELL & WILMER L.L.P.

(57) ABSTRACT

An actuator assembly may comprise a control unit and a shape memory coil spring in electrical communication with the control unit. The shape memory coil spring may increase from a first length to a second length in response to receiving a current from the control unit. The shape memory coil spring may be configured to translate a spacer and/or a slider shaft in response to increasing in length. The shape memory coil spring may be configured to transition a pawl in a latch assembly from a retracted state to an erected state, and vice versa.

20 Claims, 16 Drawing Sheets

CARGO RESTRAINT ACTUATOR ASSEMBLY

CROSS-REFERENCE TO RELATED APPLICATIONS

This application is a non-provisional of, and claims priority to, and the benefit of India Provisional Application No. 20/2041007985 with access code 8AE9, entitled "CARGO RESTRAINT ACTUATOR ASSEMBLY," filed on Feb. 25, 2020, which is hereby incorporated by reference in its entirety.

FIELD

The present disclosure relates generally to cargo handling systems and, more particularly, to actuator assemblies and latch assemblies for cargo handling systems.

BACKGROUND

Cargo handling systems for aircraft typically include various tracks and rollers disposed on a cargo deck that spans the length of a cargo compartment. Cargo may be loaded from an entrance of the aircraft and transported by the cargo system to forward or aft locations, depending upon the configuration of the aircraft. Cargo handling systems, such as, for example, those used on aircraft for transport of heavy containerized cargo or pallets, also referred to herein as unit load devices (ULDs), typically include restraints to lock the ULDs in the cargo compartment. Typical latches for ULDs are operated manually, which lend themselves to potential user error.

SUMMARY

An actuator assembly is disclosed herein. The actuator assembly may comprise: a control unit comprising a first positive terminal and a first negative terminal; and a first shape memory coil spring in electrical communication with the control unit, the first shape memory coil spring comprising a coil extend from a first end to a second end and back to the first end, the coil including an outer coil and an inner coil, the outer coil being disposed radially outward from the inner coil.

In various embodiments, a first coil end of the first shape memory coil spring is coupled to the first positive terminal, and a second coil end of the first shape memory coil spring may be coupled to the first negative terminal. The first coil end and the second coil end may be disposed at the first end of the first shape memory coil spring. The first shape memory coil spring may be configured to increase in length in response to receiving a current from the control unit. The actuator assembly may further comprise a second shape memory coil spring in electrical communication with the control unit. The first shape memory coil spring may be configured to translate in a first direction in response to receiving a first current, and the second shape memory coil spring may be configured to translate in a second direction in response to receiving a second current, the second direction being opposite the first direction. The actuator assembly may further comprise a slider shaft disposed through a first slider spacer and a second slider spacer, wherein the first shape memory coil spring is configured to translate the slider shaft, the first slider spacer, and the second slider spacer in the first direction, and the second shape memory coil spring may be configured to translate the slider shaft, the first slider spacer, and the second slider spacer in the second direction.

A latch assembly is disclosed herein. The latch assembly may comprise: a side plate; a side housing; a pawl assembly disposed between the side plate and the side housing; an actuator assembly disposed in the side housing, the actuator assembly comprising: a control unit; and a first shape memory coil spring in electrical communication with the control unit, the first shape memory coil spring configured to transition the pawl assembly from a retracted state to an erect state in response to receiving a first current.

In various embodiments, the actuator assembly may further comprise a second shape memory coil spring in electrical communication with the control unit, the second shape memory coil spring configured to transition the pawl assembly from the erect state to the retracted state in response to receiving a second current. The latch assembly may further comprise a first bushing coupled to the side housing and a second bushing coupled to the side housing, a slider shaft disposed through the first bushing, the second bushing, a first slider spacer and a second slider spacer, a retaining ring disposed between the first slider spacer and the second slider spacer, wherein the first slider spacer, the second slider spacer, the slider shaft, and the retaining ring are in operable communication with the first shape memory coil spring and the second shape memory coil spring. The latch assembly may further comprise a pawl lever, wherein the pawl assembly further comprises an outer pawl and an outer pawl shaft extending through the outer pawl from the side plate to the side housing. The pawl lever may be coupled to the pawl assembly and the first slider spacer, the pawl lever configured to rotate the outer pawl about the outer pawl shaft in response to the first shape memory coil spring receiving the first current. The pawl assembly may further comprise an inner pawl disposed between a first side and a second side of the outer pawl, and the inner pawl is operably coupled to the slider shaft. The latch assembly may further comprise a spring coupled to the outer pawl and the inner pawl. The first shape memory coil spring may be configured to translate in a first direction in response to receiving the first current, and the second shape memory coil spring may be configured to translate in a second direction in response to receiving the second current, the second direction being opposite the first direction.

A method of actuating a latch assembly is disclosed herein. The method may comprise: applying a first current to a first shape memory coil spring disposed in a side housing of the latch assembly, the first shape memory coil spring increasing in length in response to the first current; and stopping the first current to the first shape memory coil spring, the first shape memory coil spring decreasing in length in response to the first current stopping.

In various embodiments, the first shape memory coil spring may translate a spacer in response to increasing in length. A pawl assembly may transition from a retracted state to an erected state in response to the first shape memory coil spring increasing in length in response to the first current. The pawl assembly may remain in the erected state in response to the first shape memory coil spring decreasing in length in response to the first current stopping. The method may further comprise applying a second current to a second shape memory coil spring disposed in the side housing of the latch assembly, the second shape memory coil spring increasing in length in response to the second current, the pawl assembly transitioning from the erected state to the retracted state in response to the second shape memory coil spring increasing in length in response to the second current.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
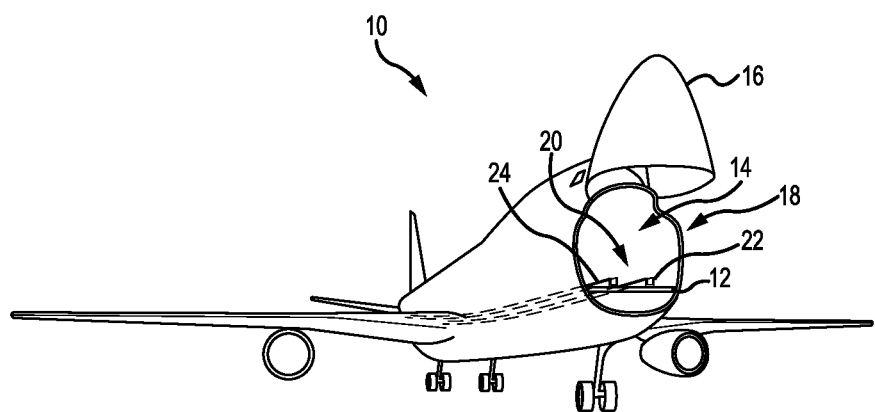
FIGS. 1A and 1B illustrate schematic views of a cargo handling system, in accordance with various embodiments.
Figure 1B:
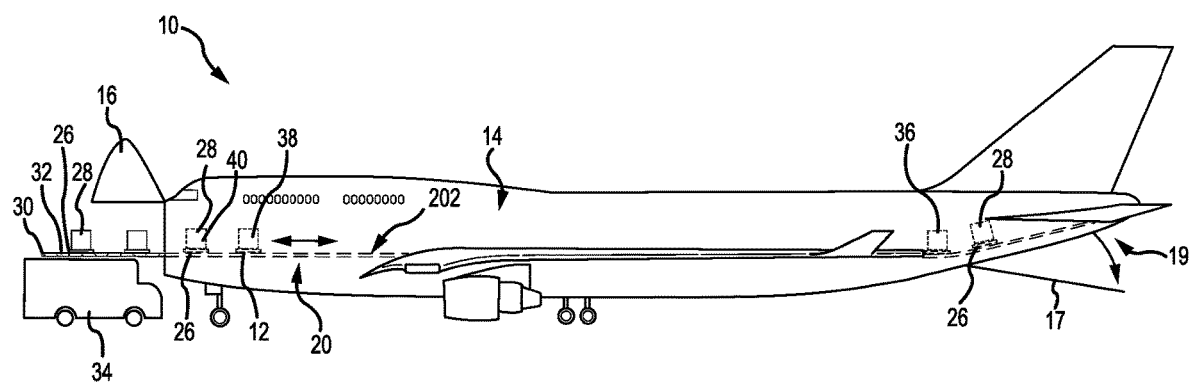

With reference to FIGS. 1A and 1B, a schematic view of an aircraft 10 having a cargo deck 12 located within a cargo compartment 14 is illustrated, in accordance with various embodiments. The aircraft 10 may comprise a cargo load door 16 located, for example, at a forward end of the aircraft 10 and configured to rotate upward (as illustrated in FIG. 1A) or sideways to expose an opening 18 that provides access to the cargo compartment 14. In various embodiments, a second cargo load door 17 may be located at other portions of the aircraft 10, such as, for example, at an aft end of the aircraft 10 and configured to rotate downward (as illustrated in FIG. 1B) and provide a second opening 19 to gain access to the cargo compartment 14. Inside the cargo compartment 14, one or more trays 20, e.g., a first tray 22 and a second tray 24, extend generally from the fore end of the aircraft 10 to the aft end of the aircraft 10. As described more fully below, the one or more trays 20 provide a support structure for which a platform 26 may transit along a length of the aircraft 10 between the fore end and the aft end and carry a ULD or some other form of cargo carrier, such as, for example, a container of a size typically used for ocean-going transport by ship or truck. Without loss of generality, a cargo load 28 of any size or shape, which may include objects within containers or ULDs or objects not within containers or ULDs, such as, for example, automobiles or the like, will be considered herein as configured for transport on the platform 26.

Still referring to FIGS. 1A and 1B, in various embodiments, the one or more trays 20, during loading or unloading of the cargo load 28, may be connected to a loading structure 30 which, in various embodiments, may comprise one or more trays 32 that correspond to the one or more trays 20 extending along the cargo deck 12 of the aircraft 10. In various embodiments, the loading structure 30 may be attached to an elevated structure, such as, for example, a truck 34 (as illustrated in FIG. 1B) or a scissor lift or a loading dock or the like, such that the one or more trays 20 and the loading structure 30 are located substantially at the same elevation and configured to transition a platform 26 either onto or off from the one or more trays 20. For example, a first cargo load 36 may be transitioned from the loading structure 30, through the opening 18 and onto the one or more trays 20, and then along the one or more trays 20 to the aft end of the aircraft, where the first cargo load is secured for transport. This may be followed by a second cargo load 38, a third cargo load 40 and so on until the cargo deck 12 is filled to a desired capacity with cargo. After the aircraft 10 has reached its destination, each cargo load, such as, for example, the first cargo load 36, the second cargo load 38 and the third cargo load 40 are unloaded from the aircraft 10 in similar fashion, but in a reverse sequence to the loading procedure. To ensure cargo loads are restrained, the aircraft 10 may include a restraint assembly as described herein and in accordance with various embodiments.

Figure 2:
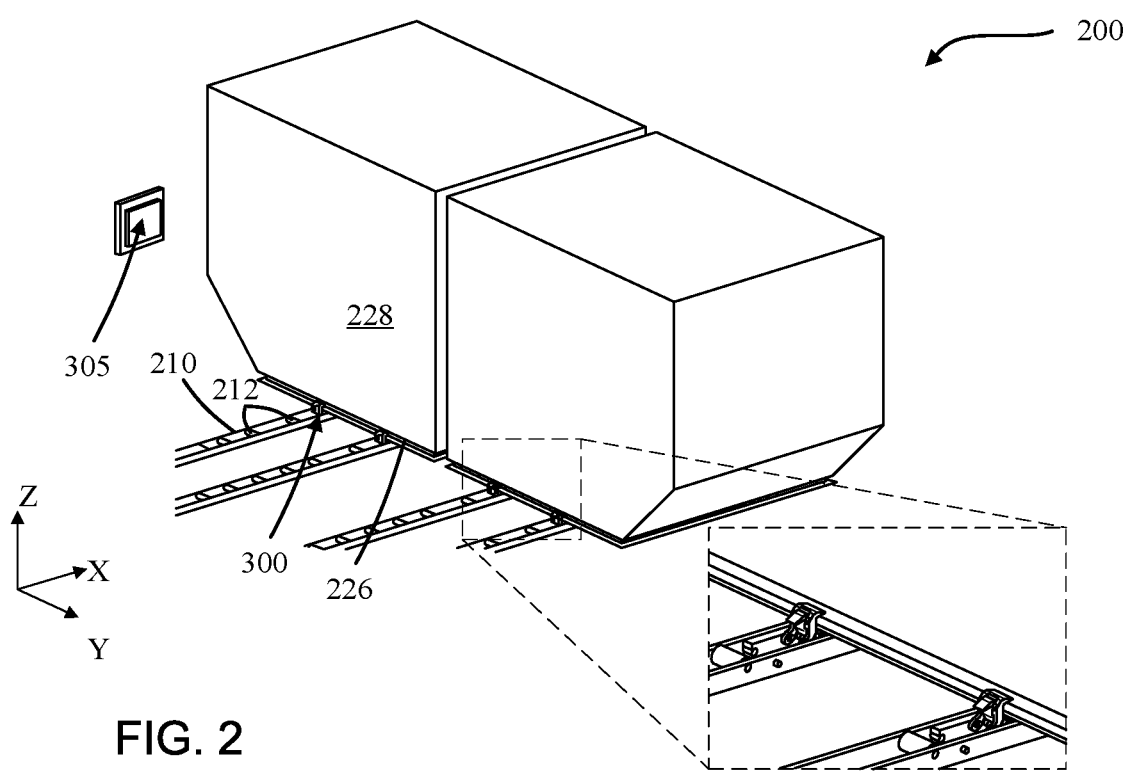
FIG. 2 illustrates a portion of a cargo handling system, in accordance with various embodiments.

Referring now to FIG. 2, a portion of a cargo handling system 200 is illustrated, in accordance with various embodiments. The cargo handling system 200 is illustrated with reference to an XYZ coordinate system, with the X-direction extending longitudinally in an aft direction (and defining a longitudinal direction), the Y-direction extending perpendicular to the X-direction (and defining a lateral direction) and the Z-direction extending vertically, each direction being with respect to an aircraft in which the cargo handling system 200 is positioned, such as, for example, the aircraft 10 described above with reference to FIGS. 1A and 1B.

In various embodiments, the cargo handling system 200 may define at least one tray 210 extending longitudinally in the aft direction (i.e., the X-direction). The tray 210 may include a plurality of rollers 212, each roller extending laterally from a first lateral side of the tray 210 to a second lateral side of the tray 210. In various embodiments, the cargo handling system 200 includes a platform 226 (or a plurality of platforms), such as, for example, the platform 26 described above with reference to FIGS. 1A and 1B. The platform 226 is configured to support a cargo load 228, which may include containerized or non-containerized cargo. As illustrated in FIG. 1B, in various embodiments, the tray 210 may include a substantially level surface throughout the length of the aircraft, though a portion of the tray 210 may be curved upward, particularly toward the aft end of the aircraft where the fuselage tends to curve upward at its base in order to facilitate takeoff and landing. The cargo handling system 200 may further comprise a latch assembly 300 and a cargo control unit 305. The cargo control unit 305 may be in electrical communication with the latch assembly 300 The latch assembly 300 may be configured to lock the platform 226 in place. For example, the control unit may be configured to transition the latch assembly 300 from a locked position to an unlocked position, or vice versa.

Figure 3:
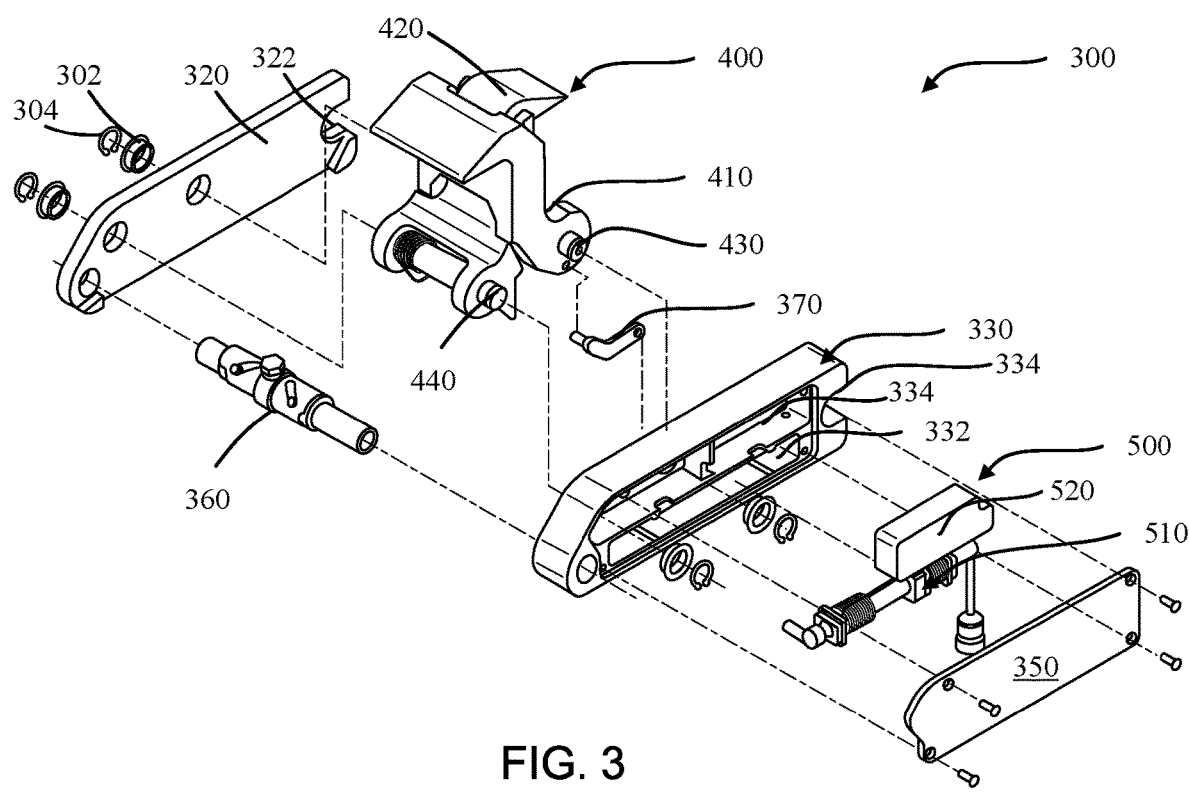
FIG. 3 illustrates an exploded view of a latch assembly, in accordance with various embodiments.

Referring now to FIG. 3, an exploded view of a latch assembly 300, in accordance with various embodiments, is illustrated. The latch assembly 300 comprises a pawl assembly 400, a side plate 320, a side housing 330, an actuator assembly 500, and a cover plate 350. The pawl assembly 400 is disposed between the side plate 320 and the side housing 330. The pawl assembly 400 includes an outer pawl 410, an inner pawl 420, an inner pawl an outer pawl shaft 430, an inner pawl shaft 440. The outer pawl shaft 430 may be disposed through the outer pawl 410 and define an outer pawl axis of rotation. Similarly, the inner pawl shaft 440 may be disposed through the inner pawl 420 and define an inner pawl axis of rotation. The outer pawl shaft 430 and the inner pawl shaft 440 may be coupled to the side plate 320 and the side housing 330 by bushings 302 and retaining rings 304, or any other method known in the art.

The actuator assembly 500 may be disposed in the side housing 330. The cover plate 350 may be configured to fully enclose the actuator assembly 500 within the side housing 330. In various embodiments, the side housing 330 comprises an actuator recess 332 and a control unit recess 334. The actuator recess 332 is configured to house the actuator 510 of the actuator assembly 500 and the control unit recess 334 is configured to house the control unit 520 of the actuator assembly 500. The actuator 510 may be configured to translate within the actuator recess 332 of side housing 330 and erect the pawl assembly 400 from a retracted position, or vice versa.

The latch assembly 300 may further comprise a locking pin assembly 360 disposed between the side plate 320 and the side housing 330. The locking pin assembly 360 is configured to couple the latch assembly 300 to the tray 210 from FIG. 2. In various embodiments, the side plate 320 may comprise an arcuate recess 322 and the side housing 330 may comprise an arcuate recess 336. The arcuate recess 322 and the arcuate recess 336 may be configured to interface with a retaining pin configured to restrain the latch assembly 300 longitudinally and rotationally on tray 210 from FIG. 2.

The latch assembly 300 may further comprise an outer pawl lever 370 operably coupled to the outer pawl 410 and the actuator assembly 500. In this regard, as the actuator 510 translates within the actuator recess 332, the outer pawl lever 370 may pivot the outer pawl 410 about the outer pawl axis of rotation defined by the outer pawl shaft 430. As such, the actuator assembly 500 may be configured to transition the pawl assembly from an erected state to a retracted state and vice versa. The actuator 510 may be in electronic communication with the control unit 520. For example, the control unit 520 may send a signal to erect the pawl assembly 400. In response to receiving the signal, the control unit 520 may send an electrical current to the actuator 510 to erect the pawl assembly. Similarly, the control unit may send a signal to retract the pawl assembly 400. In response to receiving the signal, the control unit may send an electrical current to the actuator 510 to erect the pawl assembly 400.

Figure 4:
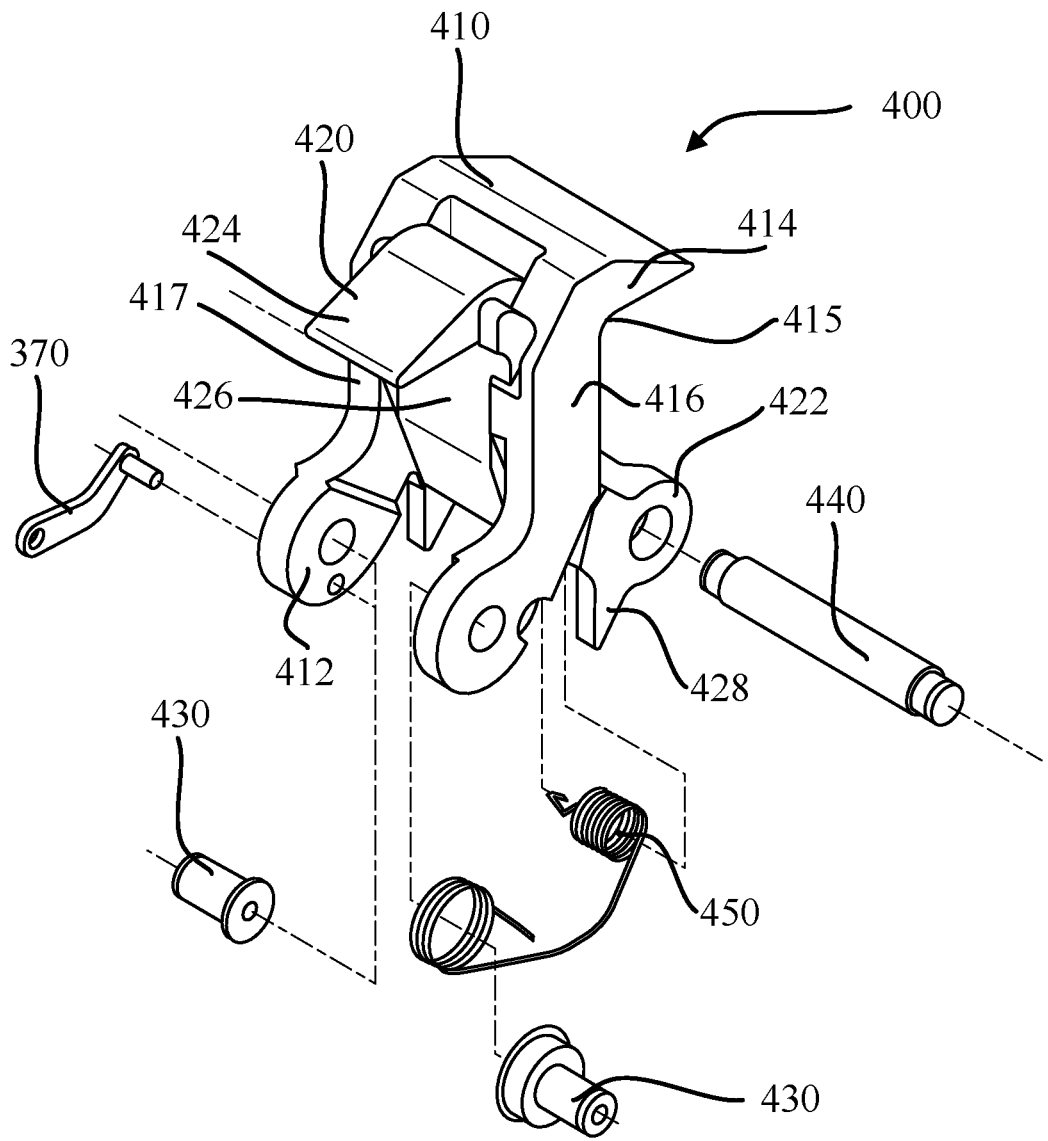
FIG. 4 illustrates an exploded view of a pawl assembly, in accordance with various embodiments.

Referring now to FIG. 4, a pawl assembly 400 is illustrated, in accordance with various embodiments. The pawl assembly 400 comprises the outer pawl 410, the inner pawl 420, the outer pawl shaft 430, and the inner pawl shaft 440. The outer pawl 410 may comprise a head end 412 and a tail end 414. The head end 412 is coupled to the side plate 320 and the side housing 330 from FIG. 3 by the outer pawl shaft 430. The tail end 414 of the outer pawl 410 may define a shoulder 415 configured to interface with a platform 226 from FIG. 2 and/or secure the platform 226 in place for transit. Similarly, the inner pawl 420 may comprise a head portion 422 and a tail end 424. The head portion 422 is coupled to the side plate 320 and the side housing 330 from FIG. 3 by the inner pawl shaft 440. The tail end 424 of the inner pawl 420 may be disposed vertically adjacent to the head end 412 of the outer pawl 410 when the pawl assembly 400 is in an erect position. Similarly, the tail end 414 of the outer pawl 410 may be disposed vertically adjacent to the head portion 422 of the inner pawl 420.

In various embodiments, the inner pawl 420 further comprises an elongated portion 426 disposed between the head portion 422 and the tail end 424. Similarly, the outer pawl 410 further comprises a first side elongated portion 416 and a second side elongated portion 417 disposed between the head end 412 and the tail end 414. The elongated portion 426 of the inner pawl 420 may be disposed between the first side elongated portion 416 and the second side elongated portion 417 of the outer pawl 410. In various embodiments, the inner pawl 420 may further comprise a protrusion 428 extending vertically away from the tail end 414 of the outer pawl 410 when the pawl assembly 400 is in an erect position.

In various embodiments, the pawl assembly 400 further comprises a spring 450. The spring 450 may be coupled to the outer pawl 410 via outer pawl shaft 430. Similarly, the spring 450 may be coupled to the inner pawl 420 via inner pawl shaft 440.

Figure 5:
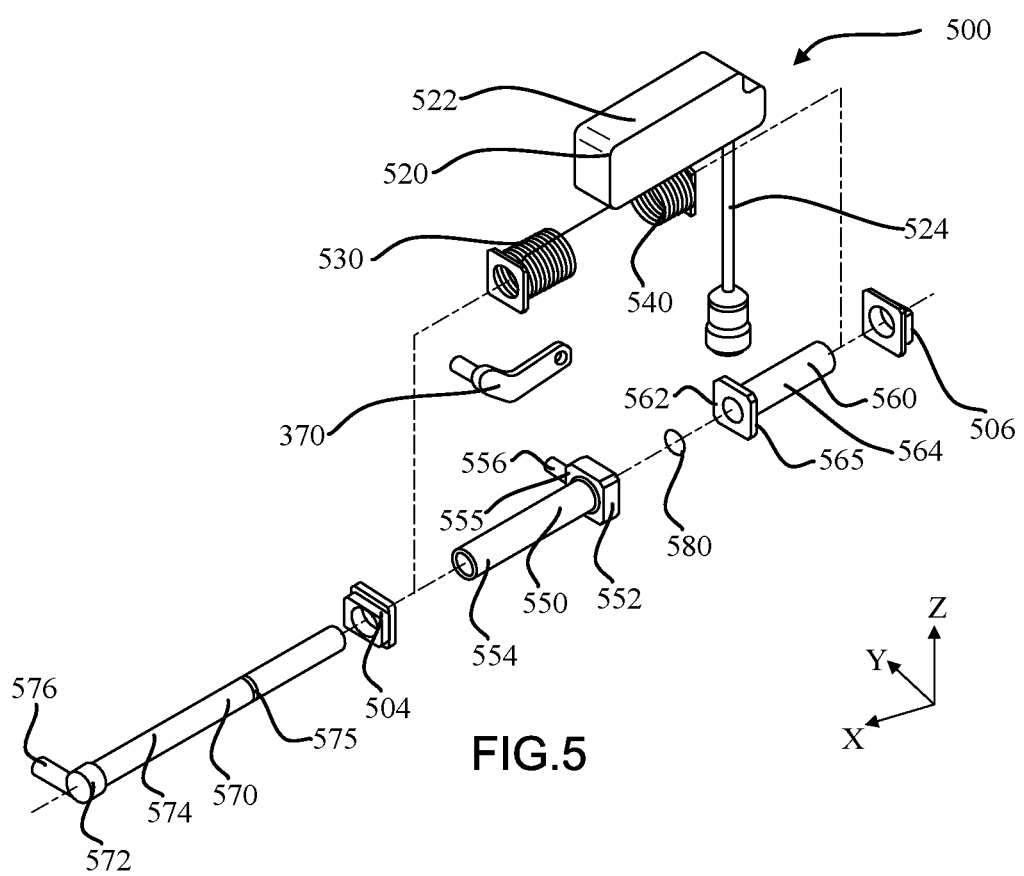
FIG. 5 illustrates an exploded view of actuator assembly, in accordance with various embodiments.

Referring now to FIG. 5, an exploded view of actuator assembly 500 is illustrated in accordance with various embodiments. The actuator assembly 500 comprises the actuator 510 and the control unit 520. The control unit 520 comprises a control unit housing 522 and a power input cable 524. The power input cable 524 may be in electrical communication with cargo control unit 305 from FIG. 2. In this regard, a command signal from cargo control unit 305 may be communicated to the control unit 520 of the latch assembly 300 and instruct the latch assembly to retract or erect.

In various embodiments, the actuator assembly 500 further comprises an erect shape memory coil spring 530, a retract shape memory coil spring 540, an erect slider spacer 550, and a retract slider spacer 560. The erect shape memory coil spring 530 is operably coupled to the erect slider spacer 550. Similarly, the retract shape memory coil spring 540 is operably coupled to the retract slider spacer 560. The erect slider spacer 550 comprises a head portion 552 and a tubular portion 554 extending longitudinally in the x-direction from the head portion 552. A first axial surface 555 of the head portion 552 disposed proximate the tubular portion 554 may be pushed in the −x direction by an end of the erect shape memory coil spring 530 during erection of the pawl assembly 400 from FIG. 4. In this regard, when erect shape memory coil spring 530 is energized, it may expand in the negative x-direction, contacting the first axial surface 555 and pushing the erect slider spacer 550 in the −x direction. The retract slider spacer 560 comprises a head portion 562 and a tubular portion 564 extending longitudinally in the −x-direction (i.e., in the opposite direction of the tubular portion 554 of the erect slider spacer 550) from the head portion 562. A first axial surface 565 of the head portion 562 disposed proximate the tubular portion 564 may be pushed in the −x-direction by an end of the retract shape memory coil spring 540 during retraction of the pawl assembly 400 from FIG. 4. In this regard, when retract shape memory coil spring 540 is energized, it may expand in the x-direction, contacting the first axial surface 565 and pushing the retract slider spacer 560 in the x direction.

The erect slider spacer 550 may further comprise a protrusion 556 extending in a lateral direction (i.e., Y-direction) from the head portion 552. The protrusion 556 may be coupled to the outer pawl lever 370. In this regard, as erect slider spacer 550 travels in x-direction during retraction, the outer pawl lever 370 may rotate the outer pawl 410 from FIG. 4 about the outer pawl shaft 430 and/or retract the outer pawl from an erect state to a retracted state.

In various embodiments, the erect shape memory coil spring 530 may be disposed radially outward of the tubular portion 554 of the erect slider spacer 550. Similarly, the retract shape memory coil spring 540 may be disposed radially outward of the tubular portion 564 of the retract slider spacer 560.

In various embodiments, the actuator assembly 500 further comprises a slider shaft 570. Slider shaft 570 includes a head portion 572, a shaft portion 574, and a protrusion 576. The shaft portion 574 extends from the head portion in the −x-direction. The shaft portion 574 may include a groove 575 configured to interface with a retaining ring 580. The retaining ring 580 may be disposed between the head portion 552 of the erect slider spacer 550 and the head portion 562 of the retract slider spacer 560. The shaft portion 574 may extend through tubular portion 554 of erect slider spacer 550 and through tubular portion 564 of retract slider spacer 560.

In various embodiments, the protrusion 576 may extend in the lateral direction (i.e., the y-direction) radially outward from the head portion 572. The protrusion 576 may be configured to interface with the protrusion 428 of inner pawl 420 of pawl assembly 400 from FIG. 4. In this regard, the protrusion 576 may pivot the inner pawl 420 about an inner pawl axis defined by the inner pawl shaft 440 from FIG. 4 during retraction of the pawl assembly 400.

In various embodiments, the actuator assembly 500 further comprises a first support bushing 504 and a second support bushing 506. In various embodiments, the first support bushing 504 and the second support bushing 506 may be coupled within the actuator recess 332 from FIG. 3. In this regard, the slider shaft 570, the erect slider spacer 550 and the retract slider spacer 560 may be supported by the first support bushing 504 and the second support bushing 506.

Figure 6:
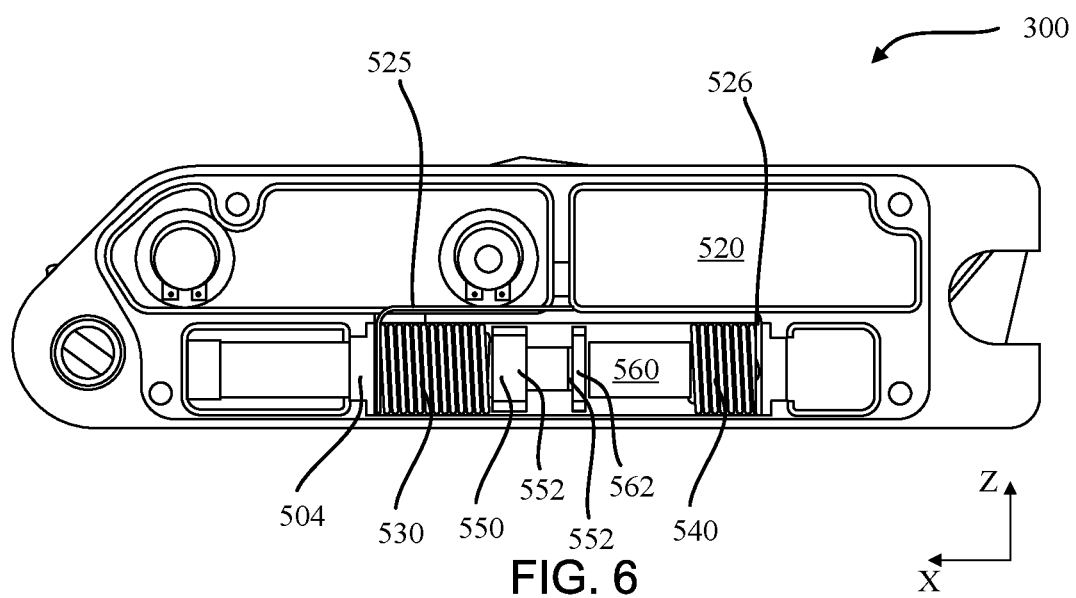
FIG. 6 illustrates a side view of a latch assembly in a retracted state with the cover plate removed, in accordance with various embodiments.

Referring now to FIG. 6, a side view of the latch assembly 300 in a retracted state with the cover plate 350 removed for clarity, is illustrated, in accordance with various embodiments. In various embodiments, the control unit 520 comprises an erect coil circuit cable 525 extending from the control unit to a first end of the erect shape memory coil spring 530. The first end of the erect shape memory coil spring 530 may be disposed proximate first support bushing 504. During erection from the retracted state, the control unit 520 may provide a current through the erect shape memory coil spring 530, which energizes the erect shape memory coil spring 530 and causes the erect shape memory coil spring 530 to expand in the −x-direction away from the first end of the erect shape memory coil spring 530. In response, the head portion 552 of the erect slider spacer 550 is pushed towards the head portion 562 of retract slider spacer 560 until the head portion 552 contacts the retaining ring 580 and pushes the retract slider spacer 560 in the −x-direction, until an erected state is reached.

Similarly, the control unit 520 comprises a retract coil circuit cable 526 extending from the control unit to a first end of the retract shape memory coil spring 540. The first end of the retract shape memory coil spring 540 may be disposed proximate second support bushing 506. During retraction from the erected state, the control unit 520 may provide a current through the retract shape memory coil spring 540, which energizes the retract shape memory coil spring 540 and causes the retract shape memory coil spring 540 to expand in the x-direction away from the first end of the retract shape memory coil spring 540. In response, the head portion 562 of the retract slider spacer 560 is pushed towards the head portion 552 of erect slider spacer 550 until the head portion 562 contacts the retaining ring 580 and pushes the retract slider spacer 560 in the −x-direction, until an retracted state is reached.

Figure 7A:
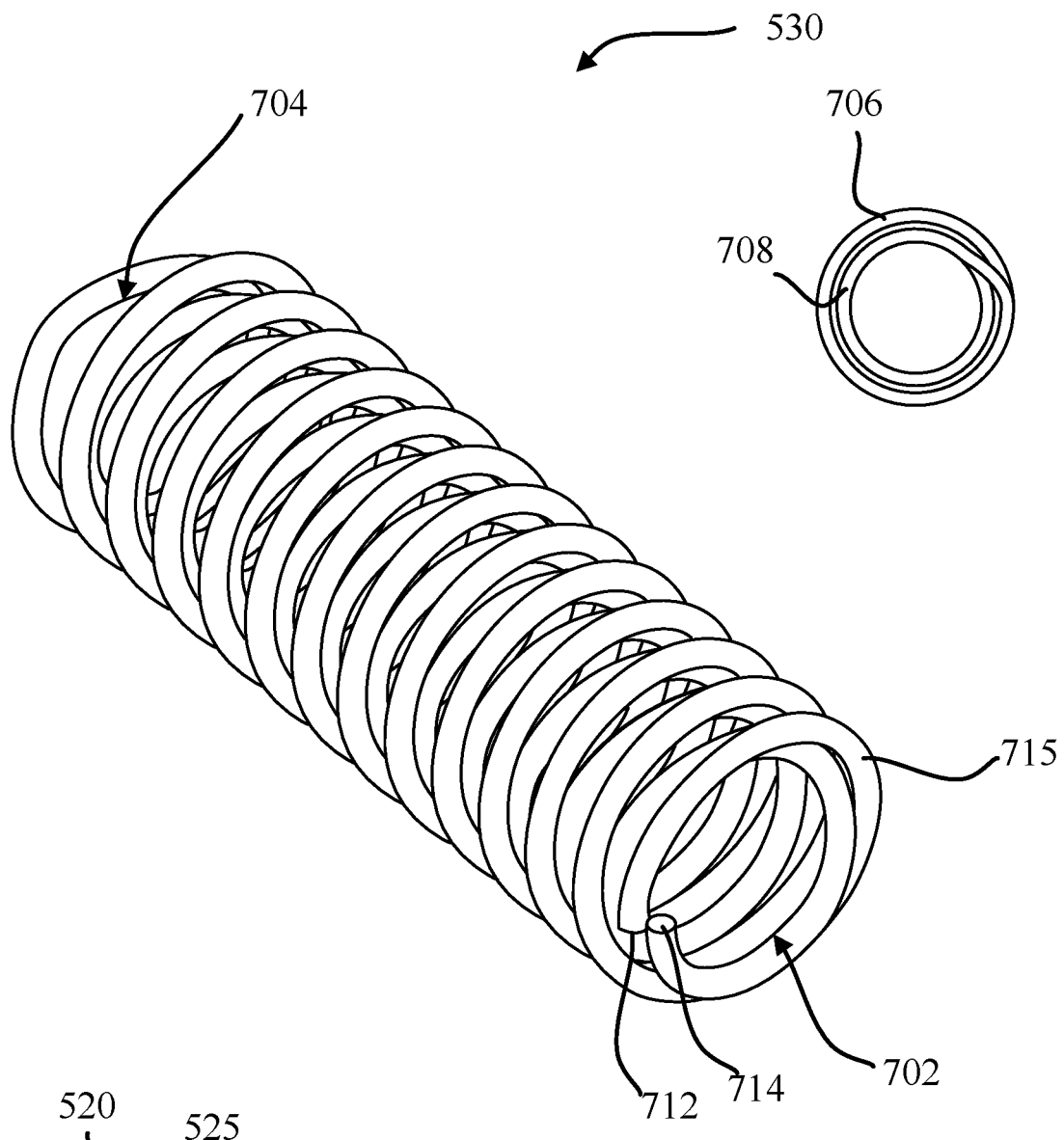
FIG. 7A illustrates a shape memory coil spring, in accordance with various embodiments.

Referring now to FIG. 7A, an erect shape memory coil spring 530, in accordance with various embodiments, is illustrated. The erect shape memory coil spring 530 may comprise a coil 517 wound in two concentric layers. In this regard, erect shape memory coil spring 530 may extend from a first end 702 to a second end 704 and back to the first end 702. In this regard, coil 517 may comprise an outer shape memory coil 706 and an inner shape memory coil 708. The inner shape memory coil 708 may be disposed radially inward of the outer shape memory coil 706. With combined reference to FIGS. 6 and 7, erect coil circuit cable 525 may comprise a positive terminal and a negative terminal. The positive terminal may be in electrical communication with a first coil end 712 of the outer shape memory coil 706 disposed at first end 702 of the erect shape memory coil spring 530, and the negative terminal may be in electrical communication with a second coil end 714 of the inner shape memory coil 708 disposed at first end 702, or vice versa. In various embodiments, the retract shape memory coil spring 540 may be in accordance with the erect shape memory coil spring 530 as illustrated in FIG. 7A.

Figure 7B:
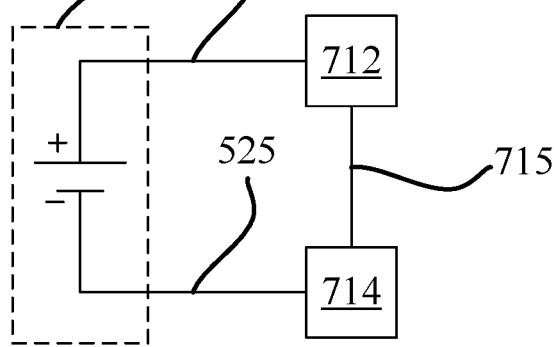
FIG. 7B illustrates a schematic drawing of an electrical circuit of the actuator assembly, in accordance with various embodiments.

Referring now to FIG. 7B, a schematic drawing of an electrical circuit of the actuator assembly 500 is illustrated, in accordance with various embodiments. The control unit 520 may include a positive terminal and a negative terminal. The positive terminal may be in electrical communication with the first coil end 712 and the negative terminal may be in electrical communication with second coil end 714 or vice versa. In this regard, a current may be applied from the control unit 520 from FIG. 5 and energize erect shape memory coil spring 530.

Figure 8A:
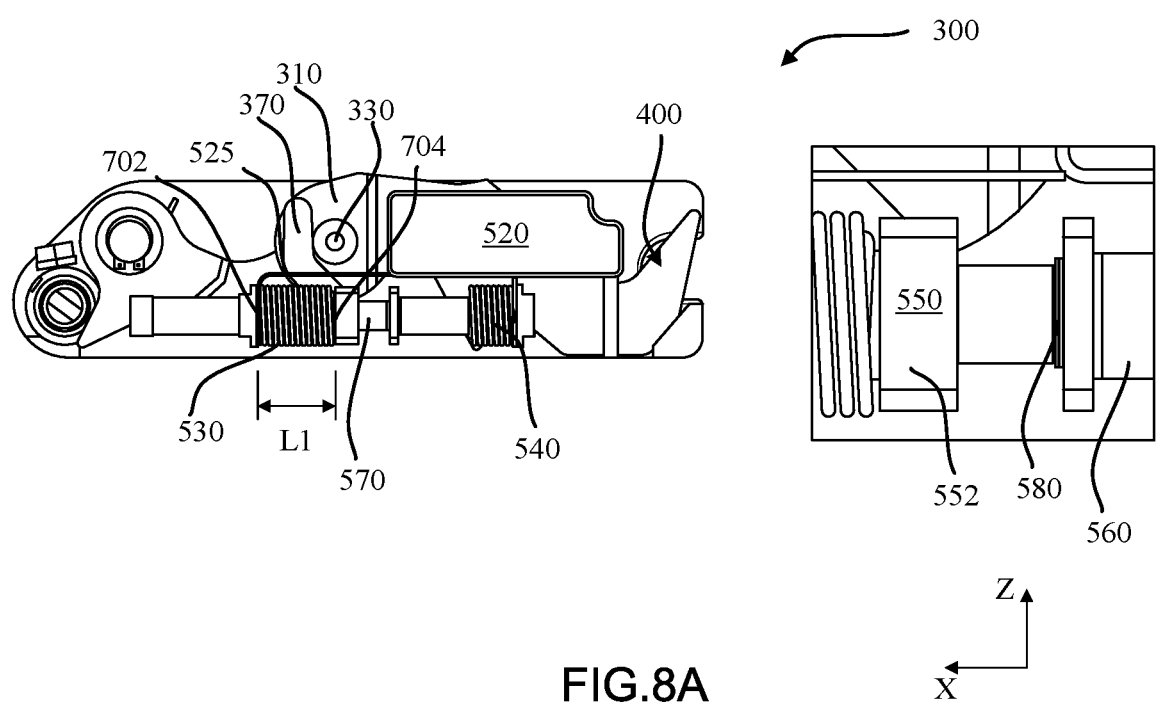
FIG. 8A illustrates a side view of a latch assembly in a retracted state with the cover plate and side housing removed, in accordance with various embodiments.

Referring now to FIG. 8A, a side view of a latch assembly 300 in a retracted state with the cover plate 350 and side housing 330 removed for clarity, is illustrated, in accordance with various embodiments. When the latch assembly 300 is in a retracted state, the erect shape memory coil spring 530 and the retract shape memory coil spring 540 are in a compact state. A "compact state" as referred to herein, is a default state of a coil when no current is being applied. In the retracted state, the retaining ring 580 and the head portion 552 of the erect slider spacer 550 are separated by a gap. In a compact state, the erect shape memory coil spring 530 may include a length L1 from first end 702 to second end 704.

Figure 8B:
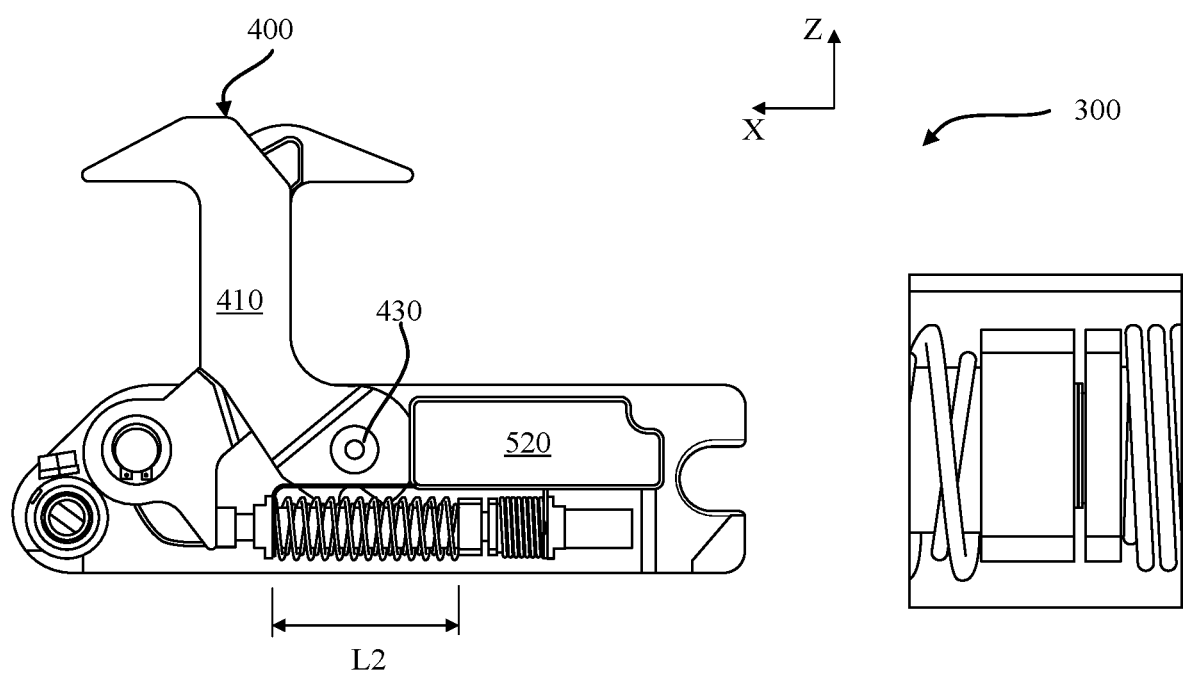
FIG. 8B illustrates a side view of a latch assembly in an erected state with the cover plate and side housing removed, in accordance with various embodiments.

With combined reference to FIGS. 8A and 8B, when the control unit 520 applies a current to the erect shape memory coil spring 530 via the erect coil circuit cable 525, the erect shape memory coil spring 530 may become energized and increasing a length of the erect shape memory coil spring 530 from L1 to L2. As the erect slider spacer 550 slides longitudinally in the—x-direction over the slider shaft 570, the erect slider spacer 550 pushes the retaining ring 580, retract slider spacer 560, and the slider shaft 570 in the—x-direction. As the erect slider spacer 550 extends in the—x-direction, outer pawl lever 370 is pulled in the −x-direction and rotates the outer pawl 410 about the outer pawl shaft 430, causing the pawl assembly 400 to transition from a retracted state (e.g., FIG. 8A) to an erected state (e.g., FIG. 8B).

Figure 8C:
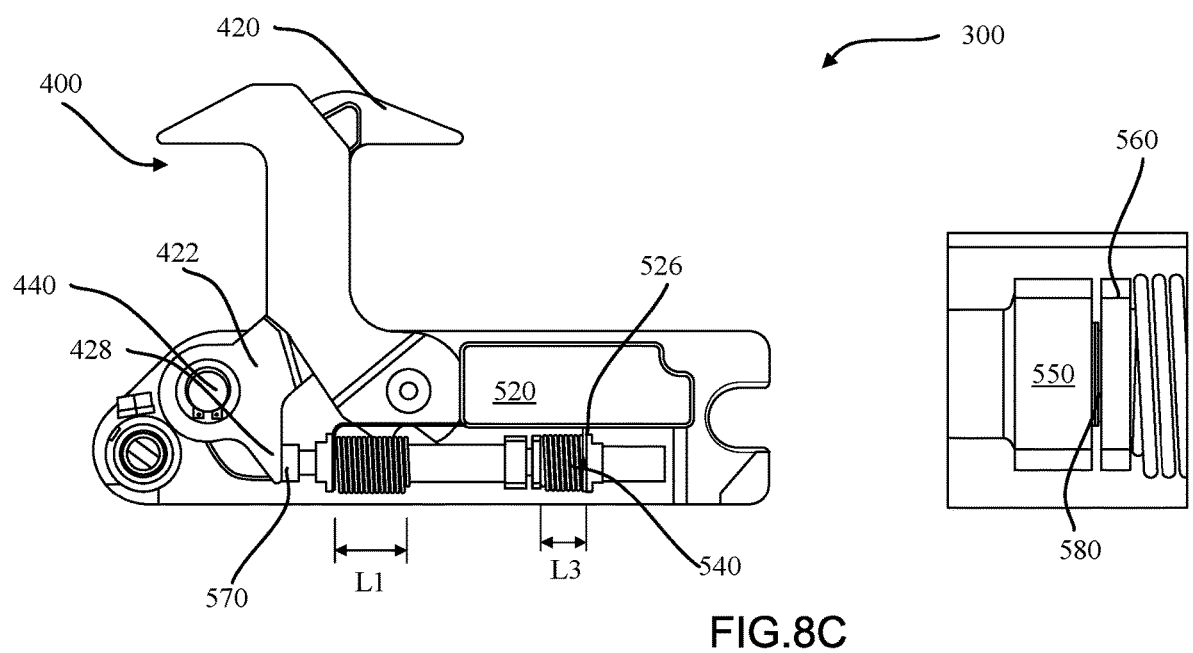
FIG. 8C illustrates a side view of a latch assembly in an erected state with the cover plate and side housing removed, in accordance with various embodiments.

With combined reference to FIGS. 8A-8C, after the pawl assembly 400 reaches the erect state, the current provided to the erect shape memory coil spring 530 may be shut off by the control unit 520. In response to the current being shut off, the erect shape memory coil spring 530 may decrease in length from L2 back to L1. Yet, the erect slider spacer 550, the retaining ring 580, the retract slider spacer 560, and the slider shaft 570 remain in the same location. In this regard, the pawl assembly 400 remains erect after the current is shut off from the erect shape memory coil spring 530, resulting in the pawl assembly being in an erected state.

Figure 9A:
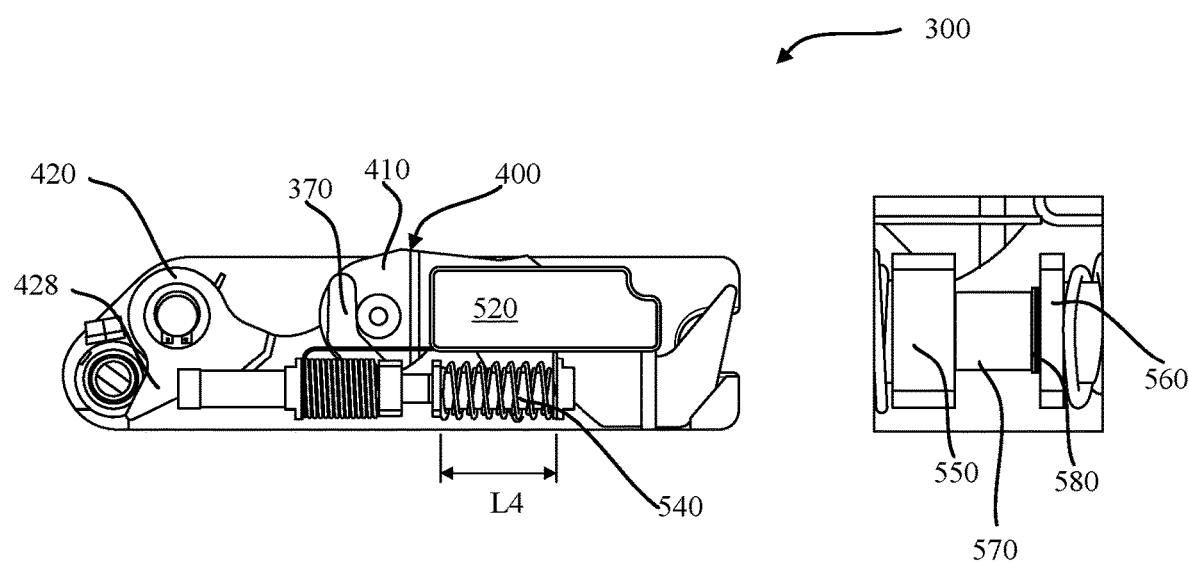
FIG. 9A illustrates a side view of a latch assembly in a retracted state with the cover plate and side housing removed, in accordance with various embodiments.
Figure 9B:
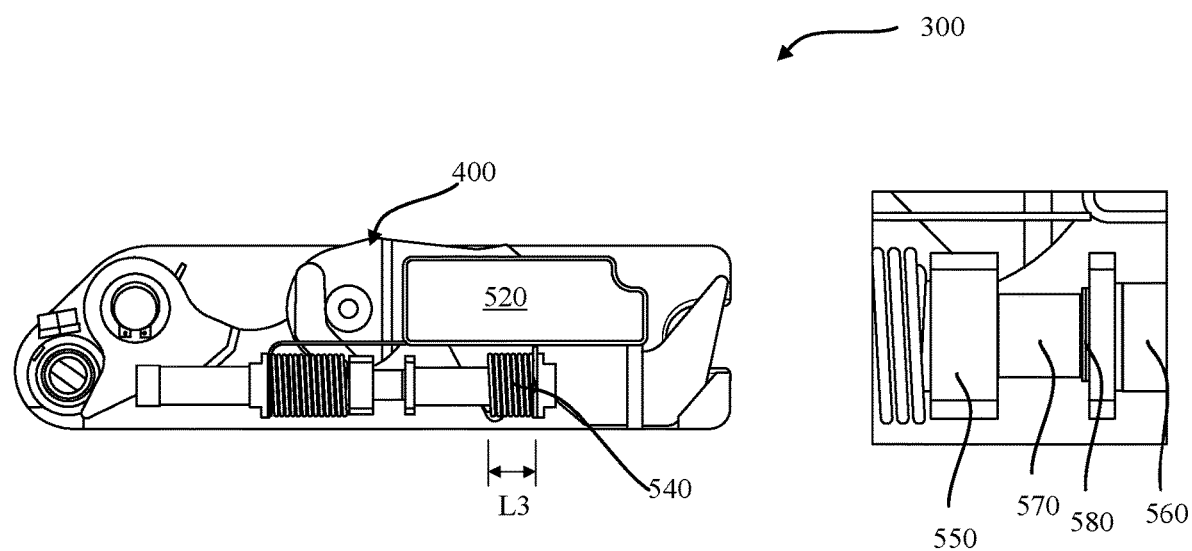
FIG. 9B illustrates a side view of a latch assembly in a retracted state with the cover plate and side housing removed, in accordance with various embodiments.

Referring now to FIGS. 8C, 9A, and 9B, a latch assembly 300 transition from an erected state to a retracted state is illustrated, in accordance with various embodiments. In the erected state (e.g., FIG. 8C), there is no gap between retaining ring 580 and the erect slider spacer 550. When the control unit 520 applies a current to the retract shape memory coil spring 540 via the retract coil circuit cable 526, the retract shape memory coil spring 540 may become energized and increasing a length of the retract shape memory coil spring 540 from L3 to L4. As the retract slider spacer 560 slides longitudinally in the x-direction, the retract slider spacer 560 pushes the retaining ring 580, the erect slider spacer 550, and the slider shaft 570 in the x-direction. With brief additional reference to FIG. 5, the protrusion 576 of slider shaft 570 interfaces with the protrusion 428 of the head portion 422 of inner pawl 420. As such, during the transition from erect state to retracted state, the protrusion 576 of slider shaft 570 pushes the protrusion 428 in the x-direction, causing the inner pawl 420 to rotate about the inner pawl shaft 440 and transition from the extracted state to the retracted state. As the erect slider spacer 550 is operably coupled to the outer pawl 410 via the outer pawl lever 370, as the slider shaft 570 continues to push the protrusion 428 of the inner pawl 420, the erect slider spacer 550 begins to separate from the retaining ring 380 until there is a gap between the retaining ring 380 and the erect slider spacer 550.

After the pawl assembly 400 reaches the retracted state, the current provided to the retract shape memory coil spring 540 may be shut off by the control unit 520. In response to the current being shut off, the retract shape memory coil spring 540 may decrease in length from L4 back to L3. Yet, the erect slider spacer 550, the retaining ring 580, the retract slider spacer 560, and the slider shaft 570 remain in the same location. In this regard, the pawl assembly 400 remains retracted after the current is shut off from the retract shape memory coil spring 540, resulting in the pawl assembly 400 being in a retracted state.

Figure 10:
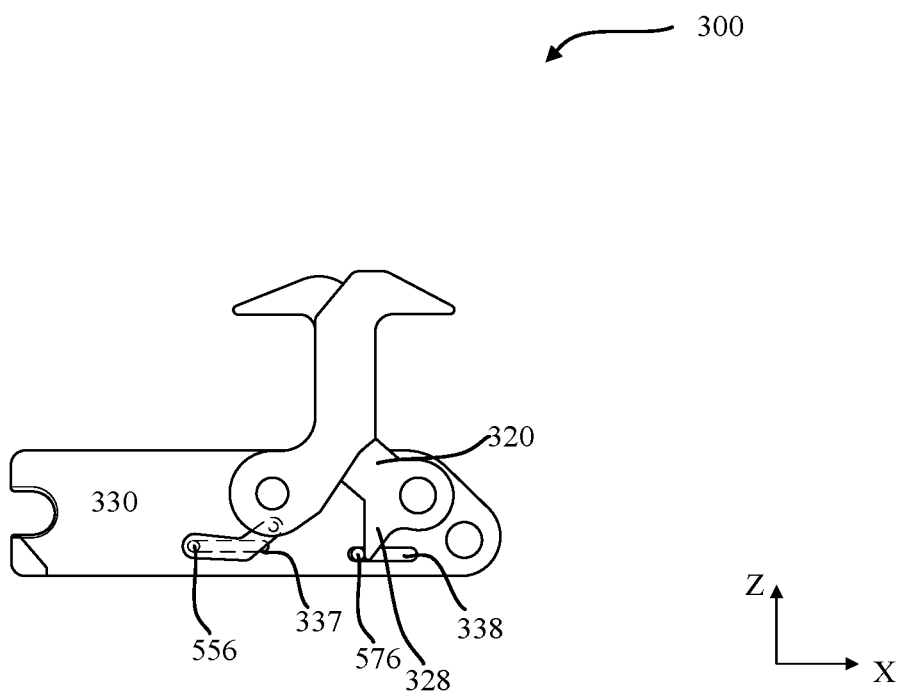
FIG. 10 illustrates a side view of a latch assembly from a side plate side with the side plate removed, in accordance with various embodiments.

Referring now to FIG. 10, a side view of the latch assembly 300 from the side plate 320 side, with the side plate 320 removed for clarity, is illustrated in accordance with various embodiments. The side housing 330 may further comprise a first elongated slot 337, and a second elongated slot 338. With combined reference to FIGS. 5 and 10, the protrusion 576 from the slider shaft 570 may be disposed in the first elongated slot 337 and the protrusion 556 from the erect slider spacer 550 may be disposed in the second elongated slot 338. In this regard, the protrusion 576 and the protrusion 556 may be configured to travel longitudinally in the x-direction during retraction and in the −x-direction during erection. The protrusion 576 of the slider shaft 570 may be in operable contact with the protrusion 328 from the inner pawl 420.

Figure 11:
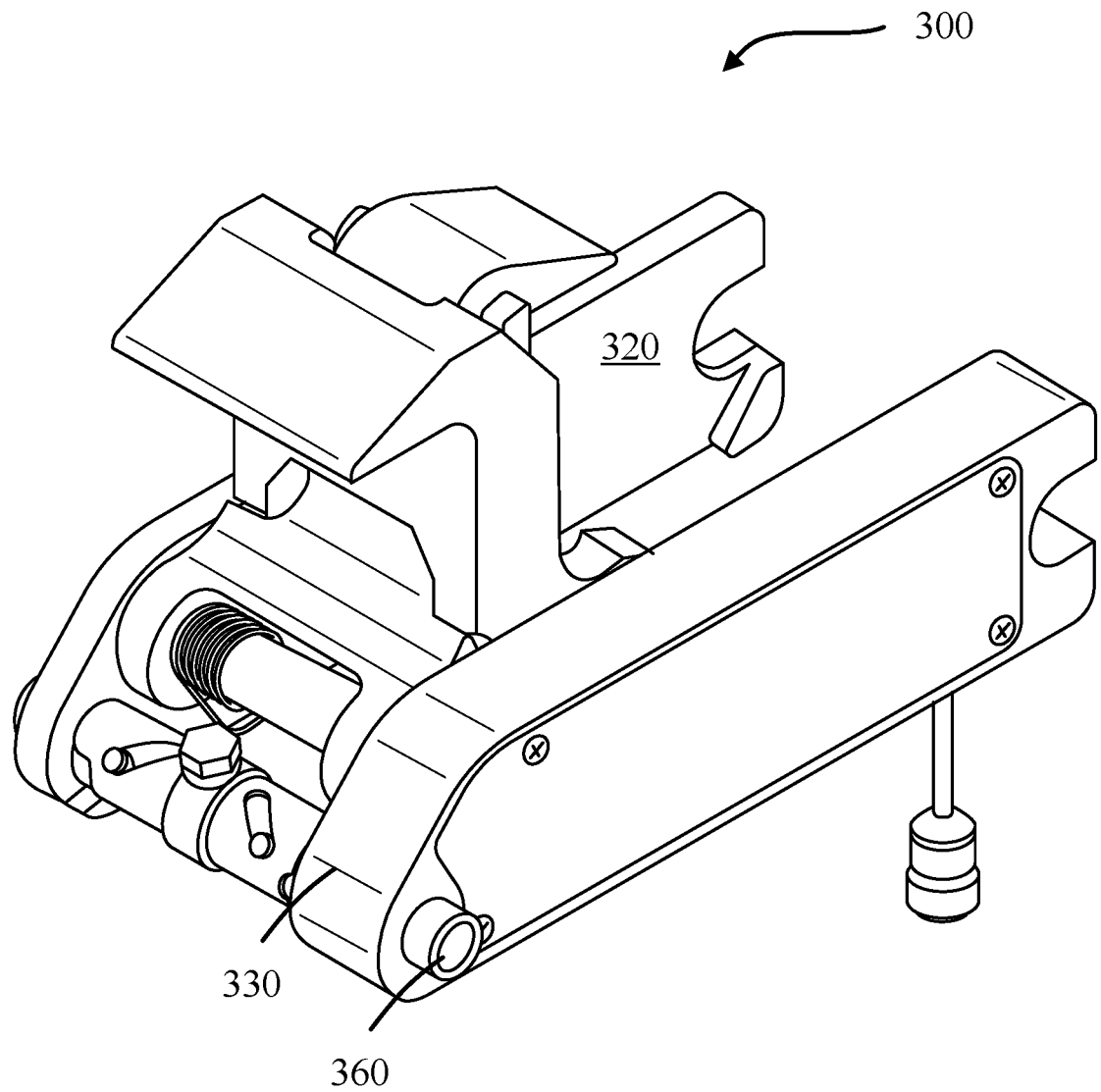
FIG. 11 illustrates a side view of the latch assembly, in accordance with various embodiments.

Referring now to FIG. 11, a perspective view of a latch assembly 300 fully assembled is illustrated, in accordance with various embodiments. The locking pin assembly 360 is configured to protrude past an outer surface of the side housing 330 and the side plate 320. In this regard, the locking pin assembly 360 may be coupled to the tray 210 from FIG. 2.

Figure 12:
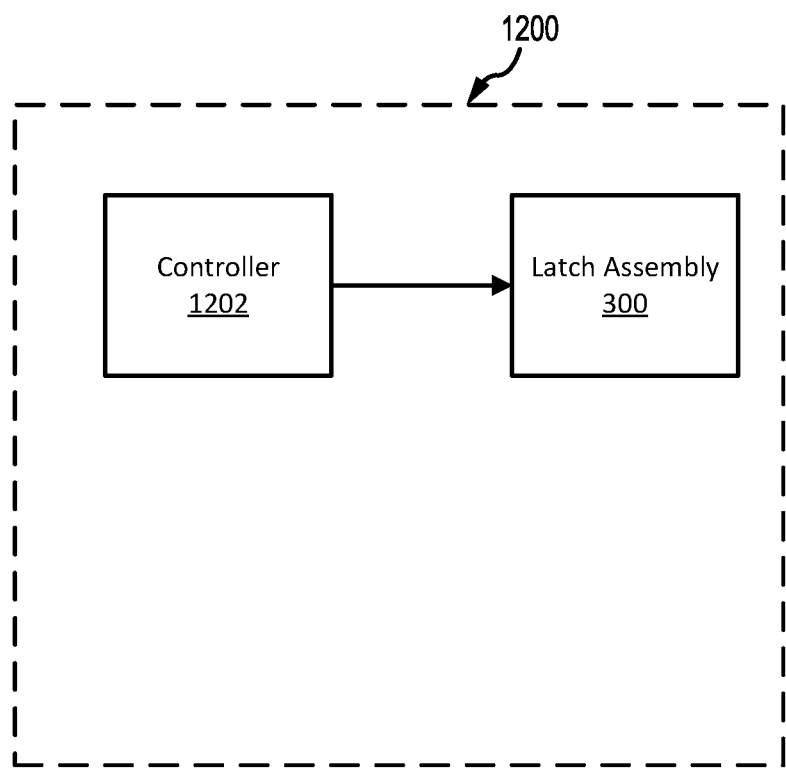
FIG. 12 illustrates a control system for a latch assembly, in accordance with various embodiments.

In various embodiments and with additional reference to FIG. 12, a schematic block diagram of a control system 1200 for latch assembly 300 is illustrated. Control system 1200 includes a controller 1202 in electronic communication with a the latch assembly 300. In various embodiments, controller 1202 may be integrated into computer system, such as cargo control unit 305 from FIG. 2. In various embodiments, controller 1202 may be configured as a central network element or hub to access various systems and components of control system 1200. Controller 1202 may comprise a network, computer-based system, and/or software components configured to provide an access point to various systems and components of control system 1200. In various embodiments, controller 1202 may comprise a processor. In various embodiments, controller 1202 may be implemented in a single processor. In various embodiments, controller 1202 may be implemented as and may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programable logic device, discrete gate or transistor logic, discrete hardware components, or any combination thereof. Controller 1202 may comprise a processor configured to implement various logical operations in response to execution of instructions, for example, instructions stored on a non-transitory, tangible, computer-readable medium configured to communicate with controller 1202.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, controller 1202 may be in electronic communication with latch assembly 300. For example, controller 1202 may be in electronic communication with power input cable 524 of the control unit 520 of the latch assembly 300. In this regard, controller 1202 may be removeably coupled to the power input cable 524 after loading of cargo in cargo handling system 200, before unloading of cargo in cargo handling system 200, or the like. erect coil circuit cable 525 and retract coil circuit cable 526

In various embodiments, controller 1202 may receive an erection command from the cargo control unit 305. In response to the erection command, the controller 1202 may command the latch assembly 300 to transition from the retracted state to the erected state. In response, current may be applied to the erect shape memory coil spring 530 via the erect coil circuit cable 525. When the current is applied to the erect coil circuit cable 525, the erect shape memory coil spring 530 may be energized and increase in length from L1 to L2. In this regard, erect shape memory coil spring 530 may translate longitudinally in side housing 330, translating the erect slider spacer 550, the slider shaft 570, the retaining ring 580, and the retract slider spacer 560 in the negative x-direction. In response to the translation, the outer pawl 410 may rotate about the outer pawl shaft 430 and the inner pawl 420 may rotate about the inner pawl shaft 440 into an erect state. Once the pawl assembly 400 is in an erect state, the current may be stopped. In response to the current stopping, the erect shape memory coil spring 530 may retract from length L2 to length L1 and the erect slider spacer 550, the slider shaft 570, the retaining ring 580, and the retract slider spacer 560 may remain stationary. Thus, as the current is turned off to the erect shape memory coil spring 530, the pawl assembly 400 may remain erect.

In various embodiments, controller 1202 may receive a retraction command from the cargo control unit 305. In response to the retraction command, the controller 1202 may command the latch assembly 300 to transition from the erected state to the retracted state. In response, current may be applied to the retract shape memory coil spring 540 via the retract coil circuit cable 526. When the current is applied to the retract coil circuit cable 526, the retract shape memory coil spring 540 may be energized and increase in length from L3 to L4. In this regard, retract shape memory coil spring 540 may translate longitudinally in side housing 330, translating the erect slider spacer 550, the slider shaft 570, the retaining ring 580, and the retract slider spacer 560 in the x-direction. In response to the translation, the outer pawl 410 may rotate about the outer pawl shaft 430 and the inner pawl 420 may rotate about the inner pawl shaft 440 into a retracted state. Once the pawl assembly 400 is in a retracted state, the current may be stopped. In response to the current stopping, the retract shape memory coil spring 540 may decrease in length from length L4 to length L3 and the erect slider spacer 550, the slider shaft 570, the retaining ring 580, and the retract slider spacer 560 may remain stationary. Thus, as the current is turned off, the pawl assembly 400 may remain retracted.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. An actuator assembly, comprising:
   a control unit comprising a first positive terminal and a first negative terminal; and
   a first shape memory coil spring in electrical communication with the control unit, the first shape memory coil spring comprising a coil extending from a first end to a second end and back to the first end, the coil including an outer coil and an inner coil, the outer coil being disposed radially outward from the inner coil.

2. The actuator assembly of claim 1, wherein a first coil end of the first shape memory coil spring is coupled to the first positive terminal, and wherein a second coil end of the first shape memory coil spring is coupled to the first negative terminal.

3. The actuator assembly of claim 2, wherein the first coil end and the second coil end are disposed at the first end of the first shape memory coil spring.

4. The actuator assembly of claim 1, wherein the first shape memory coil spring is configured to increase in length in response to receiving a current from the control unit.

5. The actuator assembly of claim 1, further comprising a second shape memory coil spring in electrical communication with the control unit.

6. The actuator assembly of claim 5, wherein the first shape memory coil spring is configured to translate in a first direction in response to receiving a first current, and wherein the second shape memory coil spring is configured to translate in a second direction in response to receiving a second current, the second direction being opposite the first direction.

7. The actuator assembly of claim 6, further comprising a slider shaft disposed through a first slider spacer and a second slider spacer, wherein the first shape memory coil spring is configured to translate the slider shaft, the first slider spacer, and the second slider spacer in the first direction, and wherein the second shape memory coil spring is configured to translate the slider shaft, the first slider spacer, and the second slider spacer in the second direction.

8. A latch assembly comprising the actuator assembly of claim 1, the latch assembly further comprising:
   a side plate;
   a side housing; and
   a pawl assembly disposed between the side plate and the side housing, wherein the actuator assembly is disposed in the side housing.

9. The latch assembly of claim 8, wherein:
   the actuator assembly further comprises a second shape memory coil spring in electrical communication with the control unit,
   the first shape memory coil spring configured to transition the pawl assembly from a retracted state to an erect state in response to receiving a first current, and
   the second shape memory coil spring is configured to transition the pawl assembly from the erect state to the retracted state in response to receiving a second current.

10. The latch assembly of claim 9, further comprising a first bushing coupled to the side housing and a second bushing coupled to the side housing, a slider shaft disposed through the first bushing, the second bushing, a first slider spacer and a second slider spacer, a retaining ring disposed between the first slider spacer and the second slider spacer, wherein the first slider spacer, the second slider spacer, the slider shaft, and the retaining ring are in operable communication with the first shape memory coil spring and the second shape memory coil spring.

11. The latch assembly of claim 10, further comprising a pawl lever, wherein the pawl assembly further comprises an outer pawl and an outer pawl shaft extending through the outer pawl from the side plate to the side housing.

12. The latch assembly of claim 11, wherein the pawl lever is coupled to the pawl assembly and the first slider spacer, the pawl lever configured to rotate the outer pawl about the outer pawl shaft in response to the first shape memory coil spring receiving the first current.

13. The latch assembly of claim 12, wherein the pawl assembly further comprises an inner pawl disposed between a first side and a second side of the outer pawl, and wherein the inner pawl is operably coupled to the slider shaft.

14. The latch assembly of claim 13, further comprising a spring coupled to the outer pawl and the inner pawl.

15. The latch assembly of claim 9, wherein the first shape memory coil spring is configured to translate in a first direction in response to receiving the first current, and wherein the second shape memory coil spring is configured to translate in a second direction in response to receiving the second current, the second direction being opposite the first direction.

16. A cargo handling system comprising at least one of the latch assembly of claim 8.

17. An aircraft comprising the cargo handling system of claim 16.

18. The cargo handling system of claim 16, further comprising a controller in electronic communication with the latch assembly, the controller configured to:
   apply a first current to the first shape memory coil spring disposed in the side housing of the latch assembly, the first shape memory coil spring increasing in length in response to the first current; and
   stop the first current to the first shape memory coil spring, the first shape memory coil spring decreasing in length in response to the first current stopping.

19. The cargo handling system of claim 18, wherein the first shape memory coil spring translates a spacer in response to increasing in length.

20. The cargo handling system of claim 18, wherein the pawl assembly transitions from a retracted state to an erected state in response to the first shape memory coil spring increasing in length in response to the first current, and wherein the operations of the controller further providing for applying a second current to a second shape memory coil spring disposed in the side housing of the latch assembly, the second shape memory coil spring increasing in length in response to the second current, the pawl assembly transitioning from the erected state to the retracted state in response to the second shape memory coil spring increasing in length in response to the second current.

* * * * *